United States Patent
Kessler et al.

(10) Patent No.: US 6,319,584 B1
(45) Date of Patent: Nov. 20, 2001

(54) FLOOR MAT SYSTEM WITH ADJUSTABLE CLIP

(75) Inventors: Ronald N. Kessler, Girard; Myron E. Ullman, Canfield, both of OH (US)

(73) Assignee: R & L Marketing & Sales, Inc., Boardman, OH (US)

( * ) Notice: Subject to any disclaimer, the term of this patent is extended or adjusted under 35 U.S.C. 154(b) by 0 days.

(21) Appl. No.: 09/435,907

(22) Filed: Nov. 8, 1999

Related U.S. Application Data (63) Continuation-in-part of application No. 09/199,107, filed on Nov. 24, 1998, now Pat. No. 6,068,908, which is a continuation of application No. 08/823,377, filed on Mar. 24, 1997, now Pat. No. 5,882,764.

(51) Int. Cl.[7] ...................................................... B32B 3/10
(52) U.S. Cl. ............................... 428/99; 428/100; 52/177
(58) Field of Search .................... 428/99, 100; 15/215, 15/217; 52/177

(56) References Cited

U.S. PATENT DOCUMENTS

| | | | |
|---|---|---|---|
| 2,070,839 | * 2/1937 | Place | 52/177 |
| 3,742,671 | 7/1973 | Ellis | 52/507 |
| 4,029,834 | 6/1977 | Bartlett | 428/62 |
| 4,796,399 | 1/1989 | Kessler et al. | 52/177 |
| 4,798,029 | * 1/1989 | Carlton | 52/177 |

FOREIGN PATENT DOCUMENTS

| | | |
|---|---|---|
| 87121 32.8 | 2/1998 | (DE) . |
| 2 066 061 A | 7/1981 | (GB) . |

* cited by examiner

*Primary Examiner*—Alexander S. Thomas
(74) *Attorney, Agent, or Firm*—Sand & Sebolt (57) ABSTRACT

A floor mat system and clip for use therewith can be installed to any floor and includes a floor mat formed from a series of first and second cris-crossed ribs which form rectangular-shaped openings therebetween, and clip having a rectangular-shape base and four outwardly extending raised projections. Certain of the second ribs have an enlarged bottom which forms a latching shoulder on each side thereof. The projections of the clip have a generally triangular-shaped end which snap-fits with the latching shoulder of the certain second ribs and which aligns with certain of the openings of the floor mat. A pair of holes are formed in the clip which align with other of the openings of the floor mat when attached thereto. A second embodiment is presented in which the clip is adjustably mounted on the floor with a pair of grommets. The adjustability of the clip with respect to the grommets allows nominal movement of the clip along the floor, facilitates reattachment of the floor mat to the clip, and helps to overcome environmental factors such as thermal expansion and contraction, as well as other factors.

12 Claims, 11 Drawing Sheets

FLOOR MAT SYSTEM WITH ADJUSTABLE CLIP

CROSS REFERENCE TO RELATED APPLICATIONS

This application is a continuation-in-part application of U.S. patent application Ser. No. 09/199,107 filed Nov. 24, 1998, now U.S. Pat. No. 6,068,908, which is, in turn, a continuation application of U.S. application Ser. No. 08/823,377 filed Mar. 24, 1997, and which issued on Mar. 16, 1999, as U.S. Pat. No. 5,882,764, the disclosures of which are incorporated herein by reference.

BACKGROUND OF THE INVENTION

1. Technical Field

Generally, the invention relates to a floor mat system and clip for use therewith. Particularly, the invention relates to a floor mat system including a clip that is movably mounted on the floor and engages the floor mat to retain the floor mat on the floor. Specifically, the invention relates to a floor mat formed with a latching shoulder and a clip which is movably secured to the floor with a grommet, the clip being formed with a plurality of latching projections which engage the latching shoulder of the floor mat to retain the floor mat adjacent the floor, a grommet permitting the clip to move with respect to the floor to facilitate engagement of the latching projections with the latching shoulder.

2. Background Information

Floor mats are often used at the entrances of businesses for customers to wipe water and snow from the bottoms of their shoes. Conventional floor mats are constructed of a flexible rubber, or plastic, or the like and are formed with a plurality of spaced apart orthogonal ribs which form rectangular-shaped openings. These conventional floor mats require that a recessed area be formed in the floor where the floor mats are located with the edges of the recessed area preventing the floor mats from sliding when walked upon by a customer. The water and snow from the customer's shoes flows through the openings keeping the top surface of the floor mat free of standing water.

Although these prior art floor mats are adequate for the purpose for which they were intended, the business owner must plan for the installation of these floor mats and have the recessed area built into the floor during construction of the building. If these prior art floor mats are merely placed on the floor without a recessed area the floor mats slide when a horizontal pressure from a customers shoes or from strong wind is applied on the mats. Alternatively, the recessed area can be dug out of the floor after the building has been constructed at a great expense to the business owner. Additionally, even when a recessed area has been provided to accept the floor mat, if large mats are utilized, or a number of mats are utilized adjacent one another, the mats may still move within the recessed area possibly causing an unsafe condition.

Therefore, the need exists for an improved floor mat system and clip for use therewith which can be easily retrofit onto any floor without modification to the floor, in which the floor mat includes a plurality of openings to allow water and snow to flow therethrough keeping a top surface of the floor mat free from standing water, which is easily removable to allow the water under the mat to be cleaned up and which easily snap-fits back onto the clips after clean-up.

As is understood in the relevant art, however, floor mats are subject to thermal expansion and contraction in conjunction with ambient conditions that change throughout the year. In a typical application, a floor mat can have a nominal length of eight feet and longer. Inasmuch as ambient conditions can typically vary between −20° Fahrenheit and 100° Fahrenheit in a typical year in many parts of the United States, the overall length differential due to thermal expansion and contraction between a given floor mat during the summer and the same floor mat during the winter can be possible. Such length differential can oftentimes cause difficulty in realigning the floor mat and the clip after removal of the mat from the clip for purposes of cleaning thereunder. The effects of thermal expansion and contraction can be exacerbated in circumstances wherein the floor mat is installed into a recessed area or is installed into a frame mounted on top of a floor. In such cases, thermal expansion of the mat can cause the mat to be misaligned with the clip even though the opposite end of the mat is disposed flush against the edge of the recessed area or the frame, which otherwise will require the floor mat to bulge upward to align the floor mat with the clip. It is thus preferred that a floor mat system be provided wherein a clip removably retains a floor mat against a floor, the clip being at least nominally adjustable with respect to the floor.

SUMMARY OF THE INVENTION

Objectives of the invention include providing a floor mat system and clip for use therewith which is easily installed to any floor without substantial modification to the floor.

Another objective is to provide such a floor mat system and clip in which the floor mat is constructed of a flexible durable material which will withstand inclement weather.

A further objective is to provide such a system and clip in which the floor mat can be easily removed from the clips to allow clean-up of any dirt, debris or water under the mat and which is easily snap-fit back onto the clips after clean-up.

Still another objective is to provide such a system and clip which can be installed into existing recessed areas to replace old mats.

Another objective of the present invention is to provide a floor mat system wherein a clip retains a floor mat against a floor, the clip being at least nominally adjustable with respect to the floor.

Another objective of the present invention is to provide a floor mat system having a clip that selectively retains a floor mat against a floor, the clip having the capacity to compensate for thermal expansion and contraction of the floor mat due to varying ambient conditions.

Another objective of the present invention is to provide a floor mat system having a floor mat, a clip, and a grommet, the grommet fixedly mounted to a floor, the grommet adjustably retaining the clip against the floor, the clip retaining the floor mat against the floor.

Another objective of the present invention is to provide a floor mat system having a clip that retains a floor mat against a floor, the clip being at least nominally adjustable in the horizontal plane.

A still further objective of the invention is to provide such a floor mat system which is of simple construction, which achieves the stated objectives in a simple, effective and inexpensive manner and which solves problems and satisfies needs existing in the art.

These objectives and advantages are obtained by the improved clip system of the present invention that is adapted to adjustably retain a floor mat against a floor, the general nature of which can be stated as including at least a first clip and at least a first fastener, the at least first fastener adapted to be attached to the floor, the at least first fastener adjustably restraining movement of the at least first clip in a first direction.

Other objectives and advantages are obtained by the improved floor mat system of the present invention that is adapted to be adjustably disposed on a floor, the general nature of which can be stated as including a floor mat, at least a first clip, the at least first clip adapted to retain the floor mat against the floor, and at least a first fastener, the at least first fastener adapted to be attached to the floor, the at least first fastener adjustably restraining movement of the at least first clip in a first direction.

BRIEF DESCRIPTION OF THE DRAWINGS

The preferred embodiments of the invention, illustrative of the best modes in which applicant has contemplated applying the principles of the invention, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
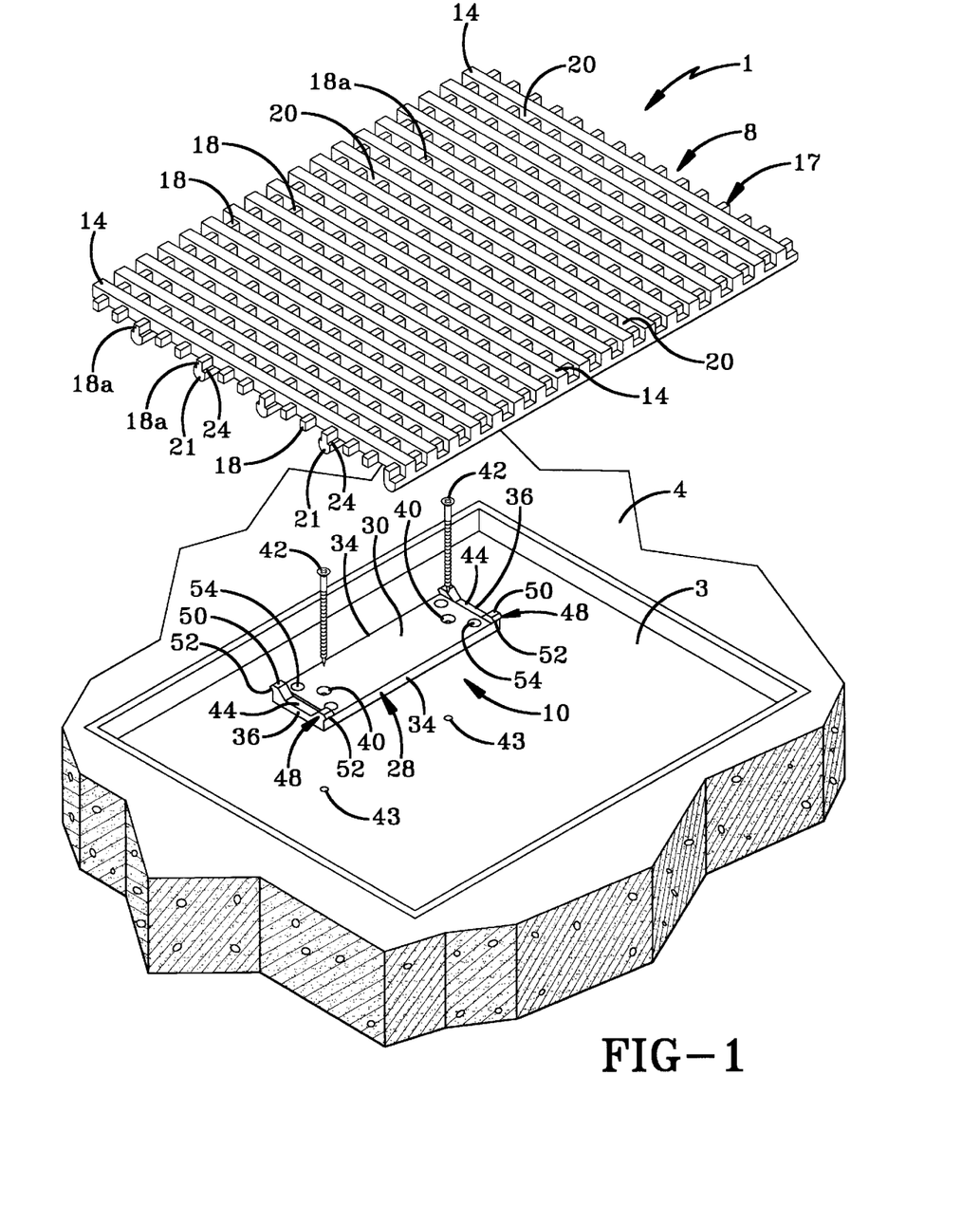
FIG. 1 is an exploded fragmentary perspective view of a first embodiment of the present invention of the floor mat system and clip for use therewith prior to being installed into a recessed area formed in a floor.
Figure 2:
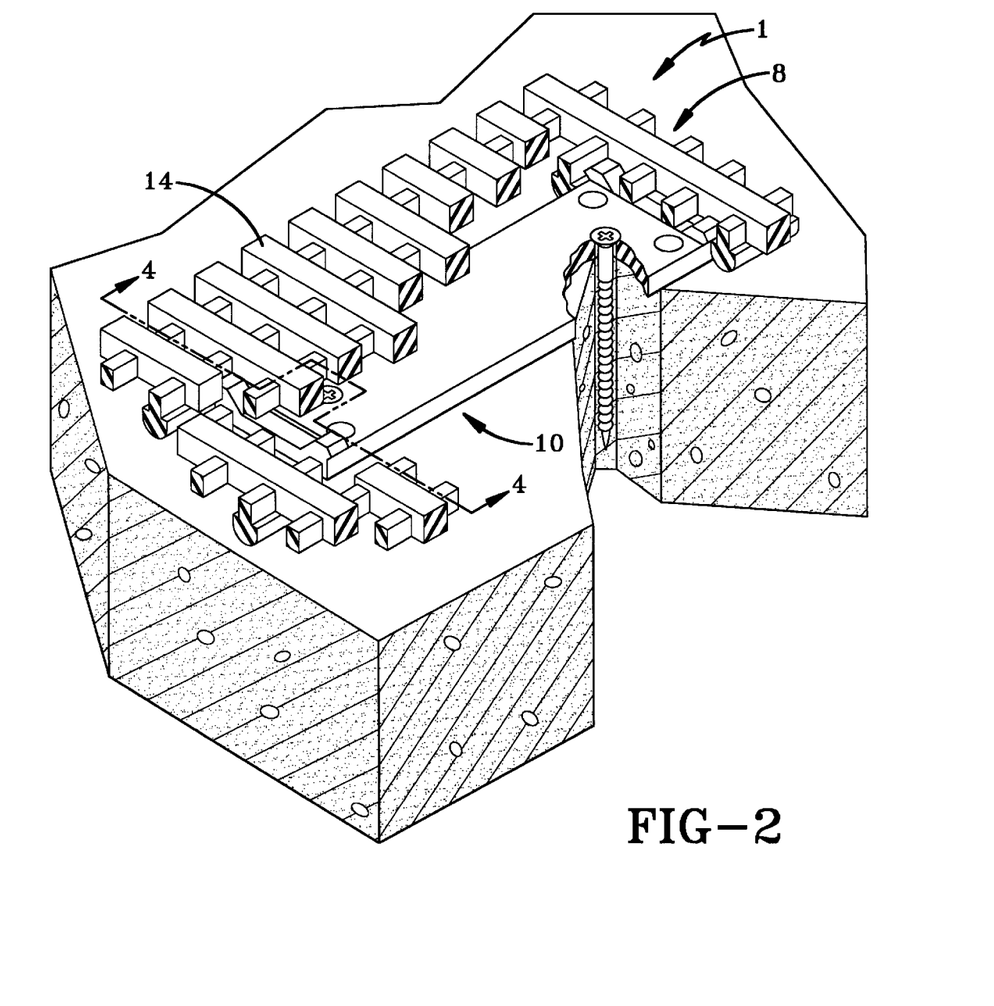
FIG. 2 is an enlarged fragmentary perspective view of the first embodiment showing the clip secured to the floor and showing the floor mat snap-fit with the clip.
Figure 3:
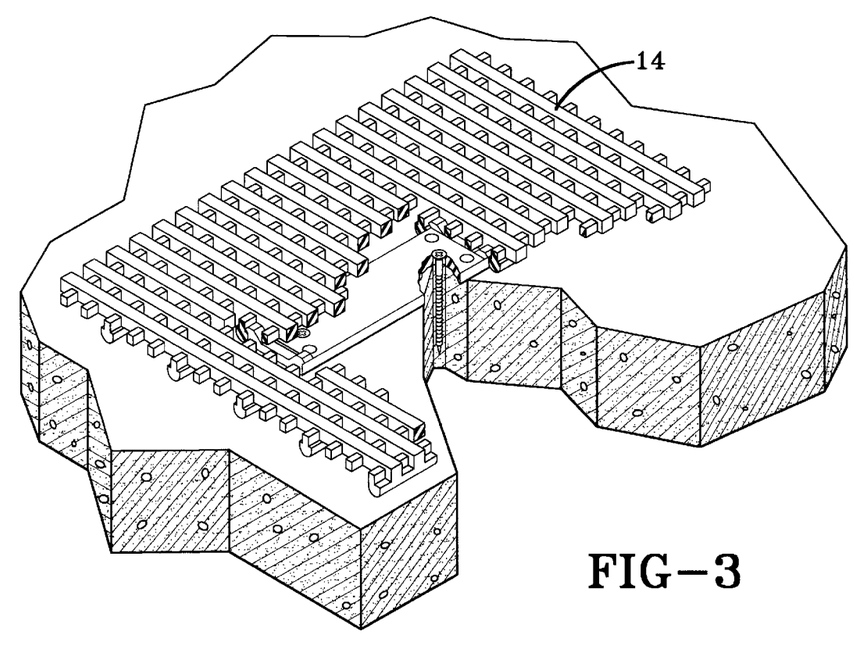
FIG. 3 is a reduced fragmentary perspective view similar to FIG. 2.

The floor mat system of the present invention is shown in FIG. 1 and is indicated generally at 1. System 1 is shown in FIG. 1 exploded from within a recessed area 3 formed in a floor 4. However, system 1 can be mounted directly on a floor 4 free of recessed area 3 without departing from the spirit of the present invention (FIGS. 2 and 3). Floor 4 may be constructed of various materials, such as wood or blacktop, and is shown in FIGS. 1–4 constructed of cement.

Figure 5:
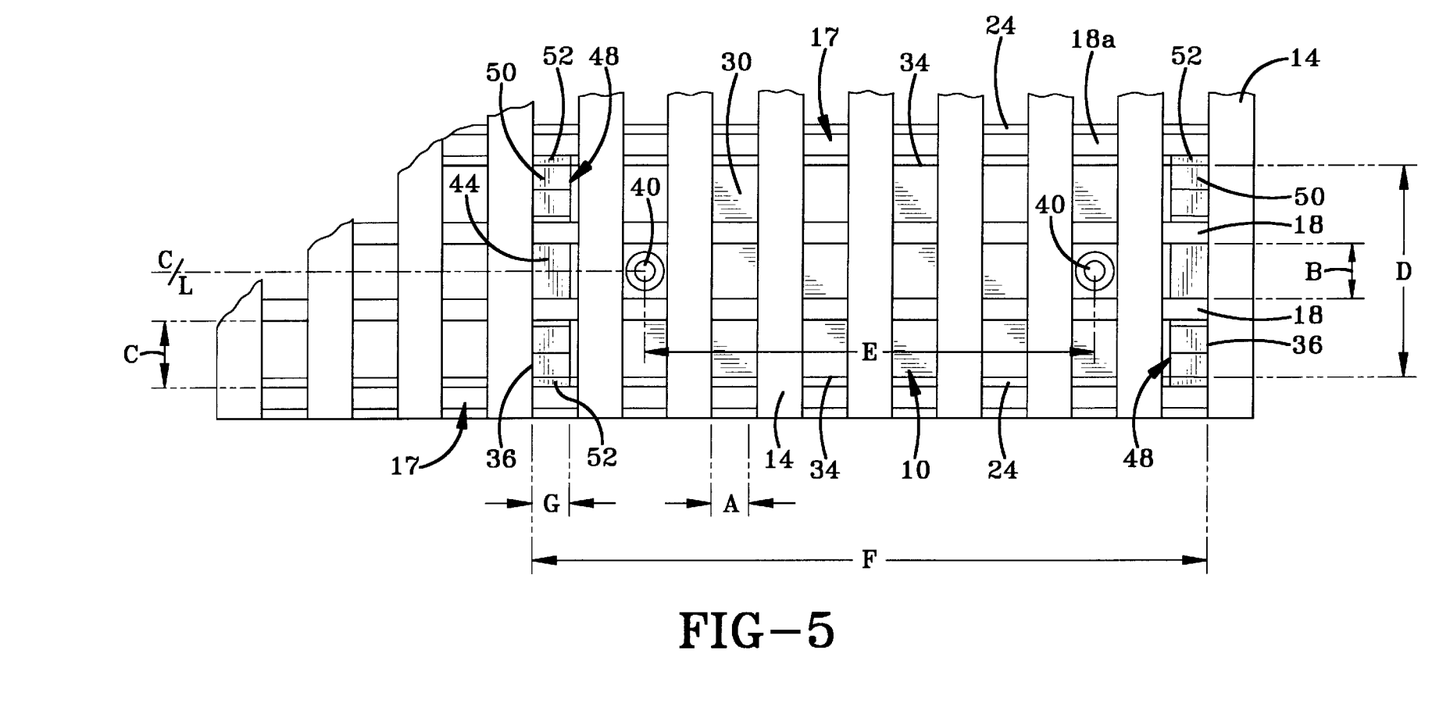
FIG. 5 is a fragmentary top plan view of the first embodiment showing the alignment of the holes of the clip with certain of the openings of the floor mat when the clip is snap-fit thereto.

System 1 includes a floor mat, indicated generally at 8, and a clip, indicated generally at 10 (FIG. 1). Floor mat 8 includes a series of first parallel rectangular-shaped ribs 14 which are spaced apart from one another by a distance A (FIG. 5) substantially equal to their width, or approximately ¼ inches. A series of second spaced parallel rectangular-shaped ribs 17 extend perpendicular to and between first ribs 14 forming rectangular openings 20 therebetween.

In accordance with one of the features of the invention, second ribs 17 consist of a pair of middle ribs 18 which extend between a pair of latching ribs 18a. Middle ribs 18 are approximately ⅛ inches wide and are separated from one another by a distance B (FIGS. 1–5) which is approximately 5/16 inches. Latching ribs 18a have an enlarged bottom 21 which forms an upwardly facing latching shoulder 24 on each side of latching ribs 18a. Latching ribs 18a are spaced apart from adjacent middle ribs 18 by a distance C (FIGS. 1–5) approximately ⅜ inches. Additionally, second ribs 17 are slightly shorter than first ribs 14 thereby creating a sculptured top surface of floor mat 8. Additionally, enlarged bottom 21 extends substantially below the bottom surface of first ribs 14 and of middle ribs 18 thereby suspending the majority of floor mat 8 above floor 4 thereby creating drainage channels for water and debris scraped from customer's shoes.

Clip 10 includes a rectangular-shaped base 28 (FIG. 1) having top and bottom surfaces 30 and 32 (FIG. 4), respectively, sides 34 and ends 36. A pair of countersunk circular holes 40 are formed in base 28. Each countersunk hole 40 receives a screw 42 therethrough which secures clip 10 to floor 4 and which further extends within a hole 43 formed in floor 4 when system 1 is installed within recessed area 3 (FIG. 1) or directly on floor 4 (FIG. 3). A small cut-out area 44 (FIG. 1) is formed adjacent each end 36 of base 28 to assist in snap-fitting floor mat 8 to clip 10 as described below.

In accordance with another of the features of the invention, a pair of raised projections 48 extends outwardly from each side 34 adjacent each end 36. Projections 48 extend angularly upwardly from cut-out area 44 and include a flat top portion 50 and a generally triangular end 52 which extends beyond sides 34 and above top surface 30 of base 28.

In accordance with a further feature of the invention, base 28 of clip 10 has a width D measured between sides 34 substantially equal to the distance between enlarged bottoms 21 of ribs 18a, or within the broad range of ¾ to 1⅝ inches, within the specific range of 1 to 1⅜ inches and in the preferred embodiment is approximately 1¾₁₆ inches. Clip 10 has a centerline C/L (FIG. 5) which aligns with the center of openings 20 formed between middle ribs 18. Holes 40 are formed in base 28 along centerline C/L and in the preferred embodiment are spaced apart by a distance E which is approximately 2½ inches wherein holes 40 are coaxial and align with certain of openings 20.

Base 28 has a length F measured between ends 36 which is substantially equal to the distance which separates certain of ribs 14 which in the preferred embodiment is approximately 4⅛ inches. Projections 48 have a width G which is slightly smaller than the distance which separates two adjacent ribs 14, or approximately ³⁄₁₆ inches, and extend beyond sides 34 by approximately ¹⁄₁₆ inches.

An additional countersunk hole 54 (FIG. 1) is formed adjacent each projection 48 for receiving additional screws 42 in the event clip 10 requires further securing to floor 4. Holes 54 align with certain of first ribs 14 when clip 10 is secured to floor mat 8.

Figure 4:
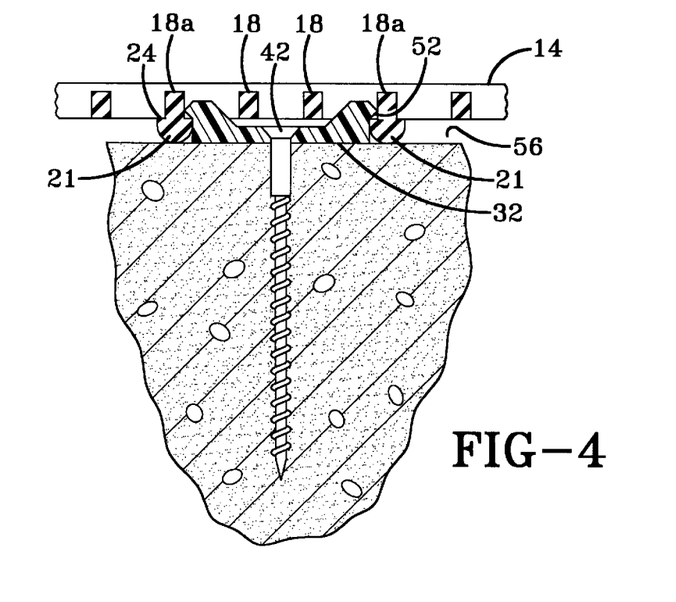
FIG. 4 is a sectional view taken along line 4—4, FIG. 2 with the mat cut away.

Floor mat system 1 of the present invention may be installed at the entrance of a business, for example, to prevent customers from tracking water or snow on the business' floors. When installing system 1, clip 10 snap-fits to floor mat 8 by placing clip 10 on the bottom surface of floor mat 8 between two latching ribs 18a (FIG. 4). Each projection 48 aligns with a certain of openings 20 formed between latching ribs 18a and the middle ribs 18 extending therebetween. When mat 8 is installed onto clip 10, clip 10 is angled to one side and projections 48 of the one side 34 are inserted into respective aligned openings 20. Projections 48 of the one side extend over latching shoulders 24 of enlarged bottom 21 of one latching rib 18a. Bottom surface 32 of the other side 34 of base 28 is pressed adjacent projections 48 toward the bottom surface of floor mat 8. The resilient material of floor mat 8 allows projections 48 of the other side to deflect enlarged bottom 21 and snap-fit over latching shoulder 24 of the other latching rib 18a. Latching shoulders 24 of latching ribs 18a thus retain clip 10 adjacent the bottom surface of floor mat 8.

A plurality of clips 10 are snap-fit to floor mat 8 as described above before floor mat system 1 is mounted on floor 4. Floor mat 8 with clips 10 snap-fit thereto is positioned within recessed area 3 of floor 4, or alternatively, is placed directly on floor 4. Enlarged bottoms 21 of latching ribs 18a contact floor 4 forming a gap 56 (FIG. 4) between floor 4 and the bottom surface of ribs 14 and 18.

Figure 6:
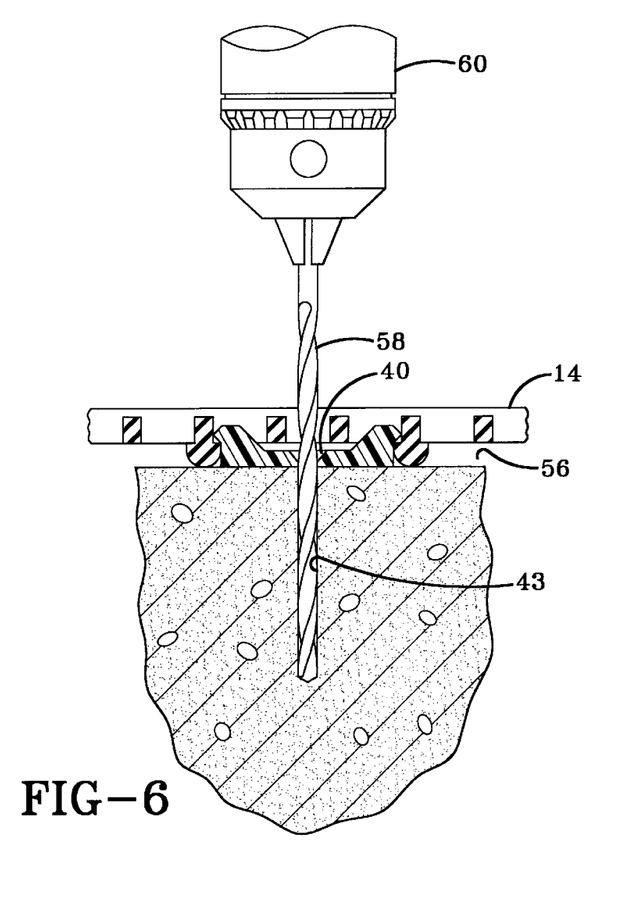
FIG. 6 is a sectional view of the first embodiment similar to FIG. 4 showing the alignment of the holes of the clip with certain of the openings of the floor mat during the installation of the floor mat to the floor.
Figure 7:
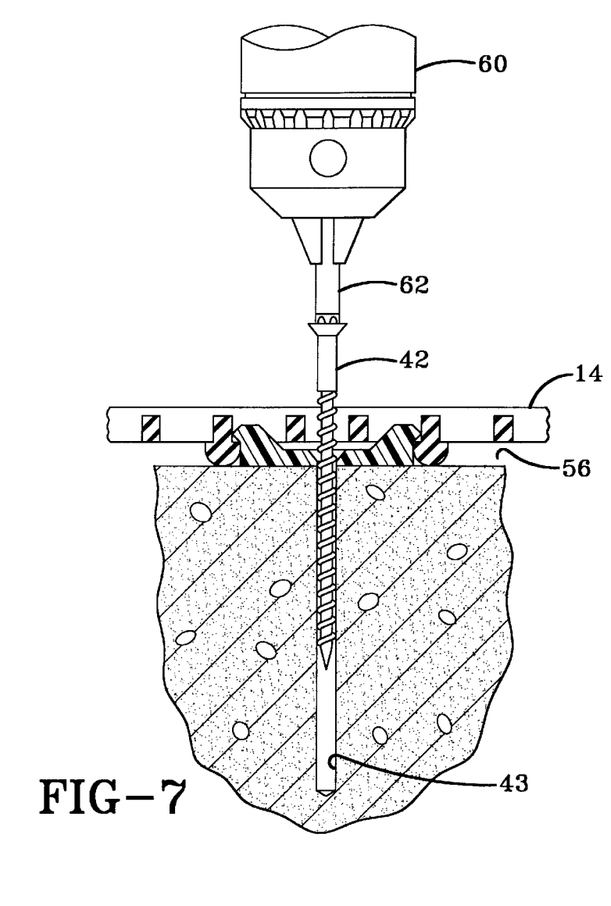
FIG. 7 is a fragmentary sectional view of the first embodiment similar to FIG. 6 showing the clip being secured to the floor.
Figure 8:
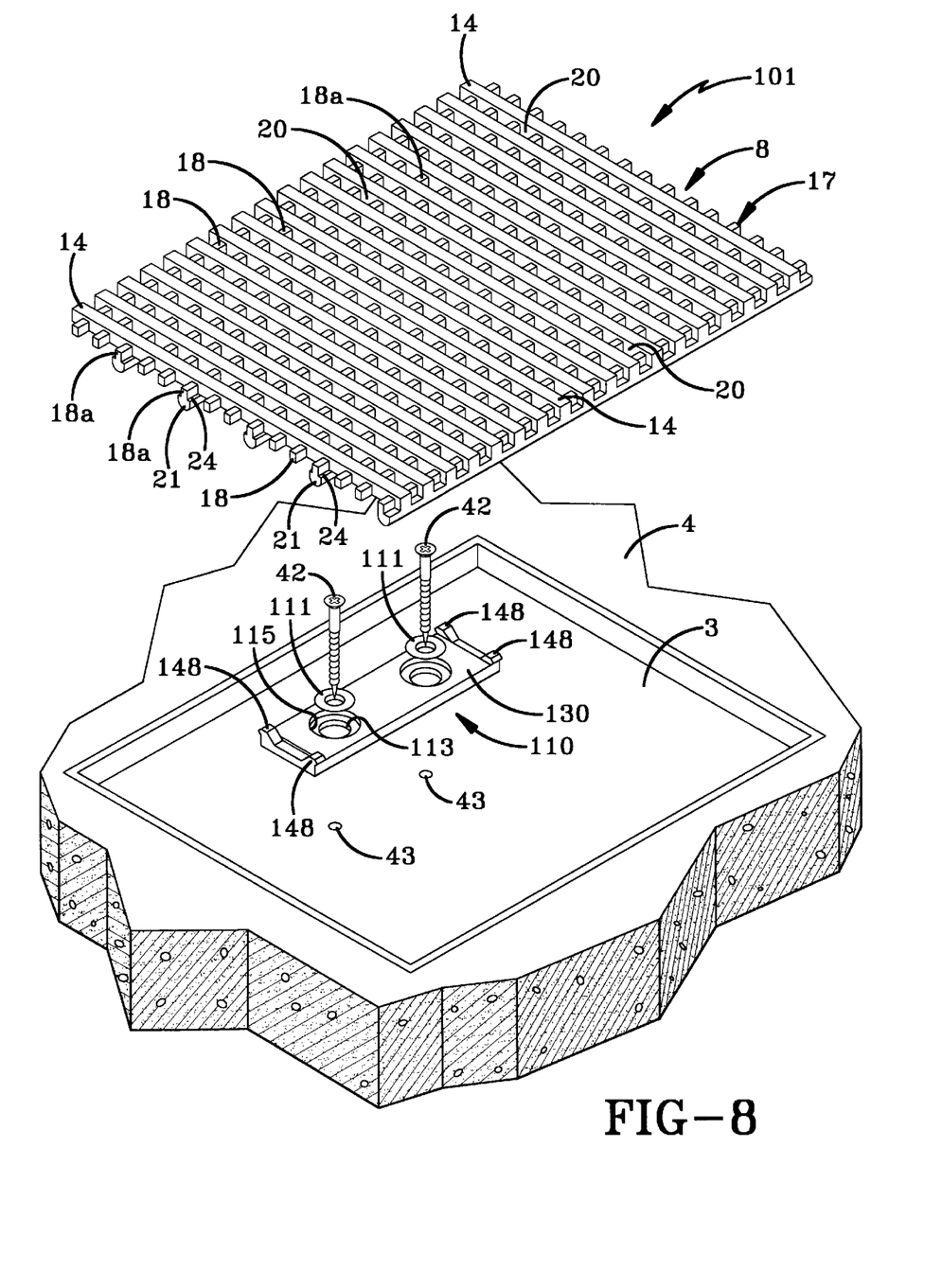
FIG. 8 is an exploded fragmentary perspective view of a second embodiment of the floor mat system of the present invention prior to being installed into a recessed area formed in a floor.
Figure 9:
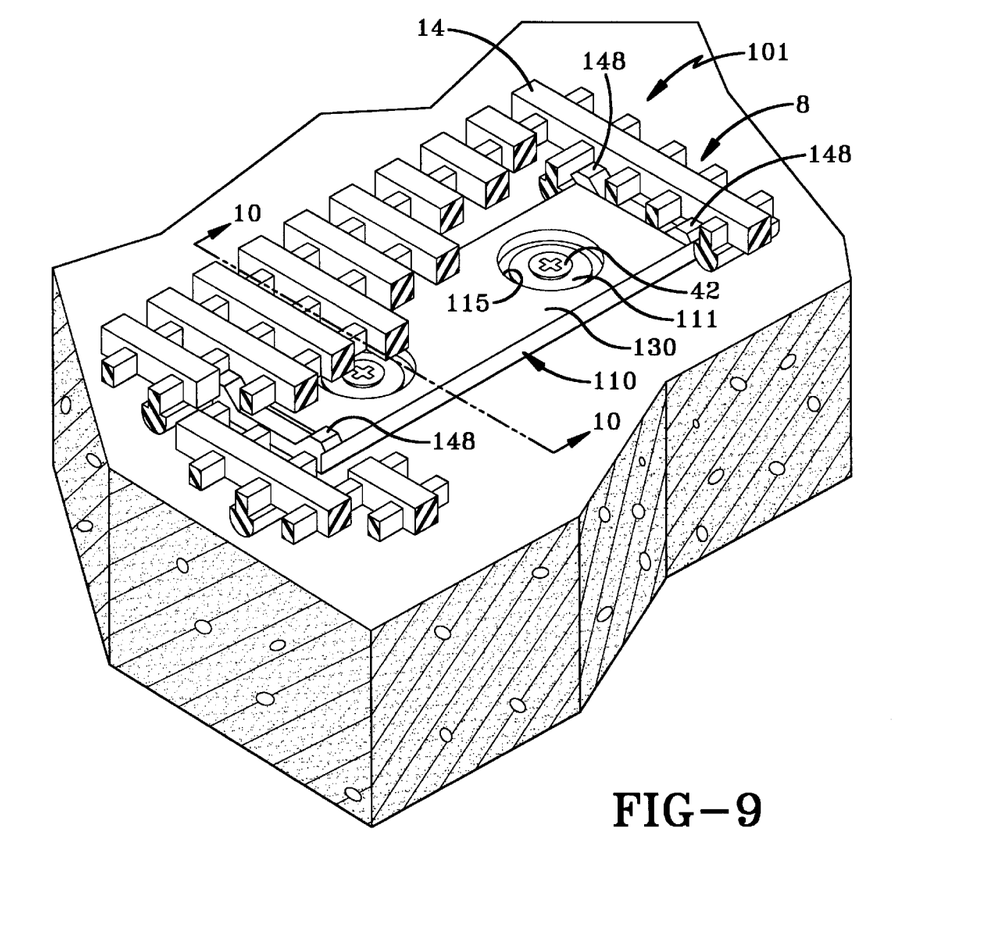
FIG. 9 is an enlarged fragmentary perspective view of the second embodiment showing the clip adjustably secured to the floor and showing the floor mat snap-fit with the clip.

Holes 40 of base 28 align with certain of openings 20 and a drill bit 58 (FIG. 6) of a drill 60 is inserted into openings 20 and the aligned holes 40 to drill holes 43 in floor 4. Screws 42 are then inserted through openings 20 and holes 40 and are tightened with a screwdriver bit 62 (FIG. 7) of drill 60 into holes 43 to secure clips 10 to floor 4 (FIG. 4).

Floor mat 8 may be walked upon by the customers of the business and clips 10 secure floor mat 8 in place to prevent sliding movement thereof. Water from the customer's shoes flows through openings 20 and settles within gap 56 between floor 4 and floor 4. If floor mat system 1 is installed within recessed area 3 (FIG. 1) or on a floor 4 which is relatively flat, floor mat 8 must be removed from clips 10 to clean-up any dirt, debris or standing water which may accumulate in gap 56. Additionally, if floor mat system 1 is installed within recessed area 3, a drain may be provided to remove standing water such that the floor mat 8 may be removed less often, and only for the purpose of removing accumulated debris.

Floor mat 8 is removed by lifting and bowing floor mat 8 upwardly at the edge thereof parallel to second ribs 17. The bowing and resiliency of floor mat 8 causes projections 48 to pop out of engagement with latching shoulder 24 of latching ribs 18a allowing floor mat 8 to be lifted out of recessed area 3 or from its position on floor 4.

After the dirt, debris or water is cleaned-up, floor mat 8 is returned to its original position on floor 4 wherein the certain of openings 20 align with projections 48. Floor mat 8 is pressed downward directly above each cutout area 44 causing floor mat 8 to bow slightly upwardly above clip 10. The bowing and the resiliency of the material of floor mat 8 allows projections 48 to snap back into engagement with latching shoulders 24 of latching ribs 18a re-securing floor mat 8 to floor 4.

Any number of clips 10 can be snap-fit to floor mat 8 and holes 40 align with openings 20 regardless of where the clips are positioned on the floor mat. Holes 54 of clips 10 may be used with additional screws 42 to further secure clips 10 to floor 4. Holes 54 align with first ribs 14 requiring that the floor mat be removed from the clips as described above, to allow access to holes 54 for drilling of holes in floor 4 and insertion of the screws therein. Screws 42 may be of any type suitable for use with floor 4 and are shown in FIGS. 2–4 as cement screws for use in cement floor 4. Also, floor mat 8 may be manufactured to any size necessary to cover the floor in front of the business' entrance or to a size complementary to that of a recessed area 3 formed in floor 4.

Additionally, it is noted that mat material may be manufactured of any resilient material such as rubber or plastic without departing from the spirit of the present invention.

Accordingly, the floor mat system 1 of the present invention is easily installed by snap-fitting a plurality of clips 10 to the bottom of floor mat 8 prior to installing floor mat system 1. Further, the alignment of holes 40 with openings 20 eliminates the time consuming task of measuring precisely where clips 10 must be mounted on floor 4 to assure projections 48 of clips 10 align with openings 20 of floor mat 8. Additionally, floor mat system 1, and particularly clips 10 thereof, allows floor mat 8 to be installed on any floor 4 with or without a recessed area 3. Also, the snap-fit engagement of projections 48 with latching shoulders 24 allow floor mat 8 to be removed from floor 4 to clean any dirt, debris or water which has accumulated within gap 56 and allow floor mat 8 to be easily snap-fit back onto clips 10 retaining floor mat 8 in a stationary position on floor 4.

A second embodiment of the floor mat system of the present invention is indicated generally at the numeral 101 in FIGS. 8–16. Floor mat system 101 is similar to floor mat system 1, except that floor mat system 101 employs a modified clip 110 that is at least nominally adjustable in a direction parallel with floor 4. Clip 110 includes a top 130 and two pairs of projections 148 in a fashion similar to that of clip 10. Instead of attaching clip 110 directly onto floor 4 with a pair of screws 42, however, screws 42 are instead employed to attach a pair of grommets 111 onto floor 4 with grommets 111 in turn adjustably attaching clip 110 to floor 4. Clip 110 and grommets 111 provide a clip system that facilitates the reinstallation of floor mat 8 against floor 4.

More specifically, clip 110 is formed with a pair of cylindrical attachment holes 113 extending therethrough and a pair of cylindrical depressions 115 axially aligned with attachment holes 113 and extending partway through clip 110 to terminate at a pair of substantially planar and annular retention surfaces 123 that are substantially parallel with and spaced below top 130. The arcuate surfaces of attachment holes 113 provide arcuate clip abutment surfaces 125.

Grommet 111 is a generally disk-shaped member formed out of a thin sheet metal such as brass, although alternate materials such as aluminum, copper, titanium, and steel, as well as other materials, may be used without departing from the spirit of the present invention. Grommet 111 includes a substantially cylindrical barrel 127 that terminates at one end at an annular flange 129 that extends perpendicularly outwardly from the central axis of barrel 127. The arcuate outer surface of barrel 127 provides an arcuate fastener abutment surface 131 that loosely interacts with clip abutment surface 125, as will be set forth more fully below. The annular surface of flange 129 adjacent fastener abutment surface 131 provides a substantially planar, annular locking ledge 133 that loosely interacts with retention surface 123, as will be set forth more fully below. It is preferred that the outermost diameter of flange 129 be at least nominally greater than the diameter of attachment hole 113.

Floor mat system 101 is installed in a fashion similar to the installation of floor mat system 1, except that screws 42 attach grommets 111 to floor 4. Specifically, clip 110 is initially attached onto floor mat 8 by engaging projections 148 over latching shoulders 24. A drill bit 58 held by a drill 60 is then inserted through aligned opening 20 in floor mat 8 and the cylindrical hole extending axially through barrel 127 of grommet 111 to drill holes 43 into floor 4. Screws 42 are then threaded into holes 43 to securely retain grommets 111 against floor 4.

Figure 11:
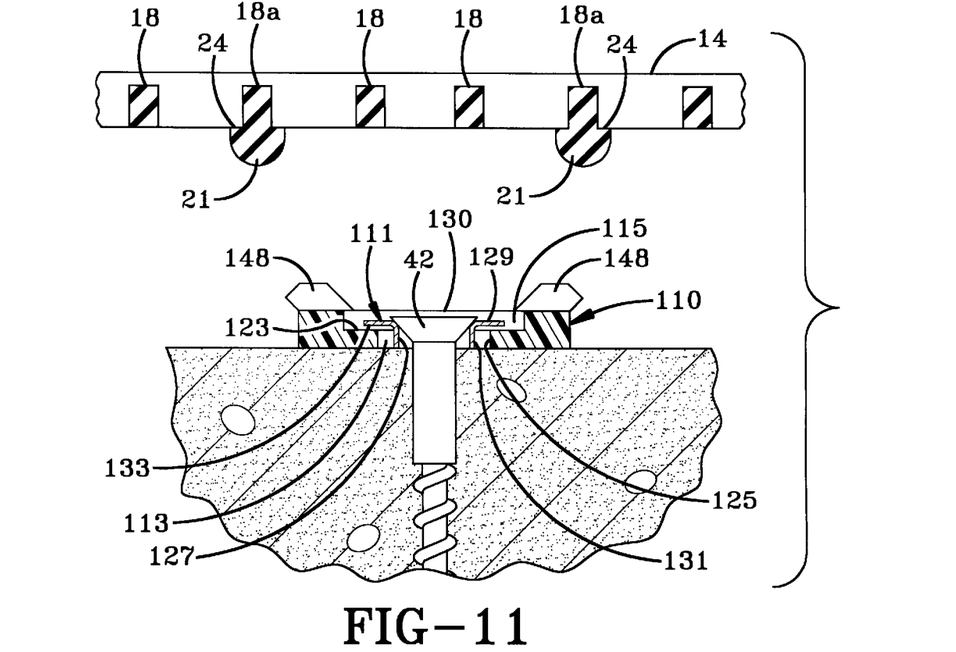
FIG. 11 is a view similar to FIG. 10, except showing the floor mat detached from the clip and being misaligned with the clip.

As is best shown in FIG. 11, the outer diameter of fastener abutment surface 131 is less than the diameter of clip abutment surface 125. Likewise, when screw 42 securely retains grommet 111 against floor 4, barrel 127 is of sufficient length that locking ledge 133 of flange 129 is disposed at a vertically higher position than retention surface 123. As such, a space exists between clip abutment surface 125 and fastener abutment surface 131 that is contiguous with a space between retention surface 123 and locking ledge 133.

It can be seen, therefore, that clip 110 is separated from grommet 111 by at least a nominal space such that clip 110 has at least a nominal movement in both a first plane parallel with floor 4 and in a first direction substantially perpendicular to the first plane. In applications wherein floor 4 is substantially horizontal, clip 110 is movably retained in the horizontal direction and has only limited movement in the vertical direction with respect to grommets 111.

As can be seen in FIGS. 8–16, the body of clip 110 extends along an imaginary longitudinal plane that is substantially parallel with floor 4 and with the first plane. Clip 110 is adjustably and movably retained against floor 4 by grommets 111 in such a fashion that clip 110 is movable along floor 4 and along the longitudinal plane with respect to grommets 111. It can be seen, therefore, that the first plane includes the longitudinal plane.

Figure 10:
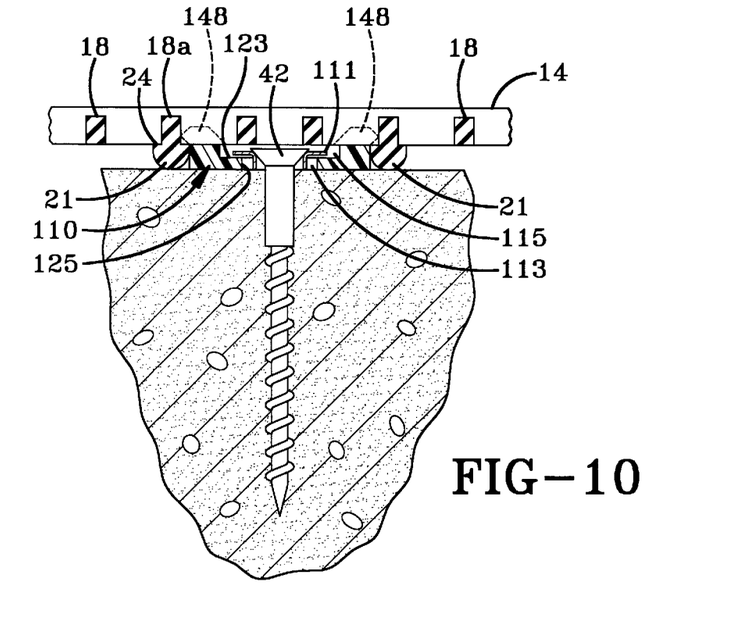
FIG. 10 is a sectional view as taken along line 10—10 of FIG. 9.
Figure 12:
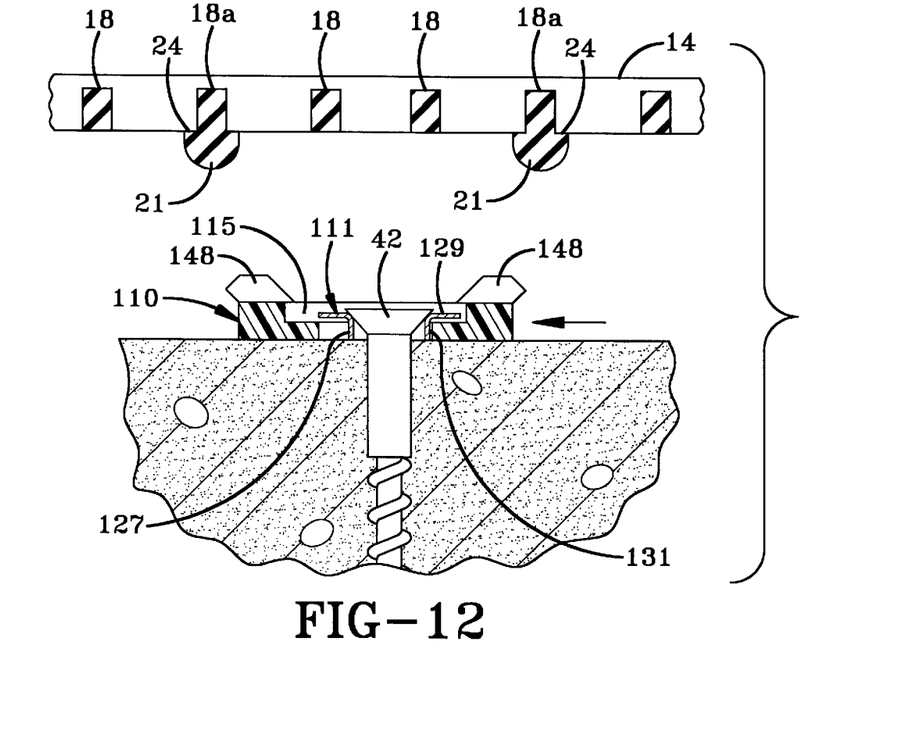
FIG. 12 is a view similar to FIG. 11, except showing adjustment of the clip into alignment with the floor mat.
Figure 13:
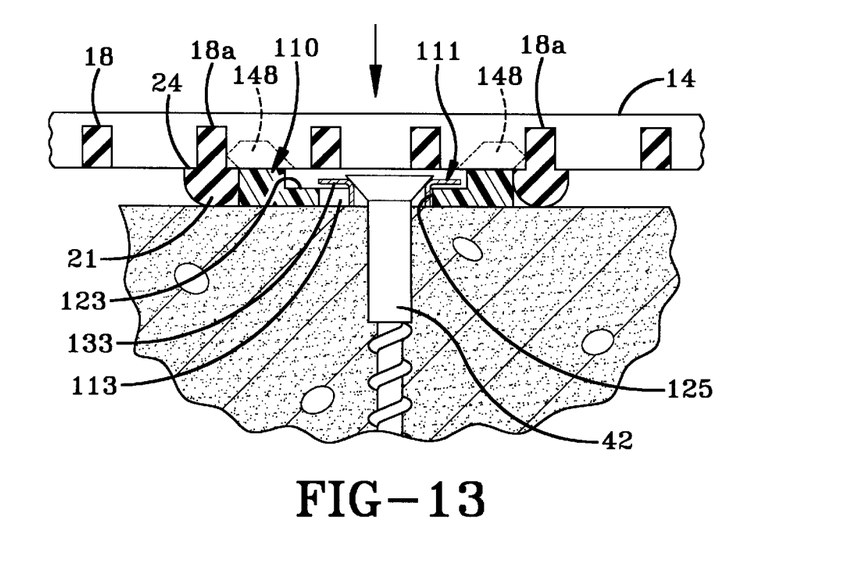
FIG. 13 is a view similar to FIG. 12, except showing installation of the floor mat onto the clip after alignment therebetween.
Figure 14:
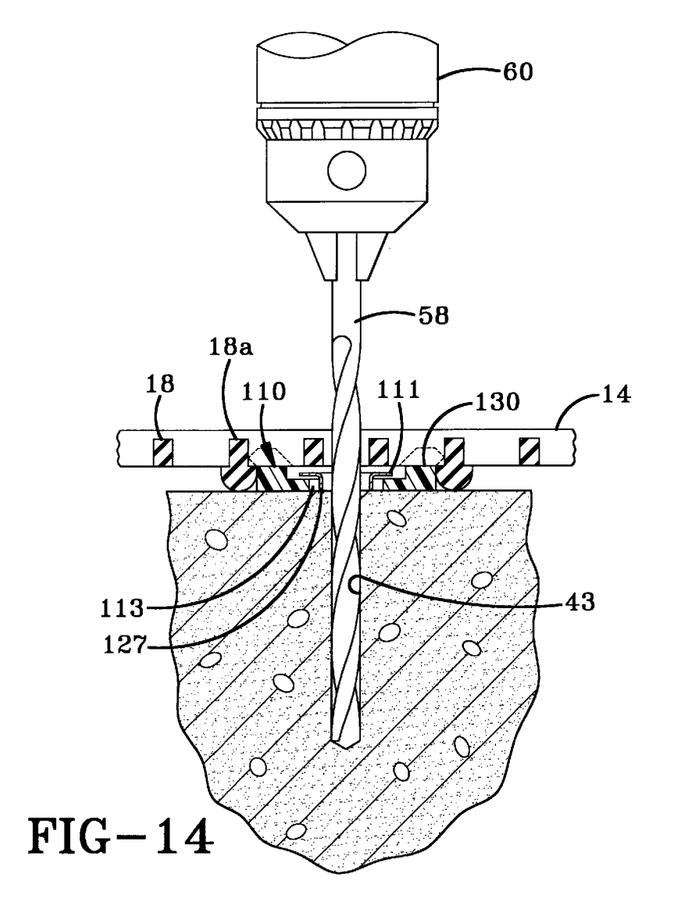
FIG. 14 is a sectional view of the second embodiment showing alignment of the attachment holes of the clip with certain of the openings of the floor mat during installation of the floor mat onto the floor.
Figure 15:
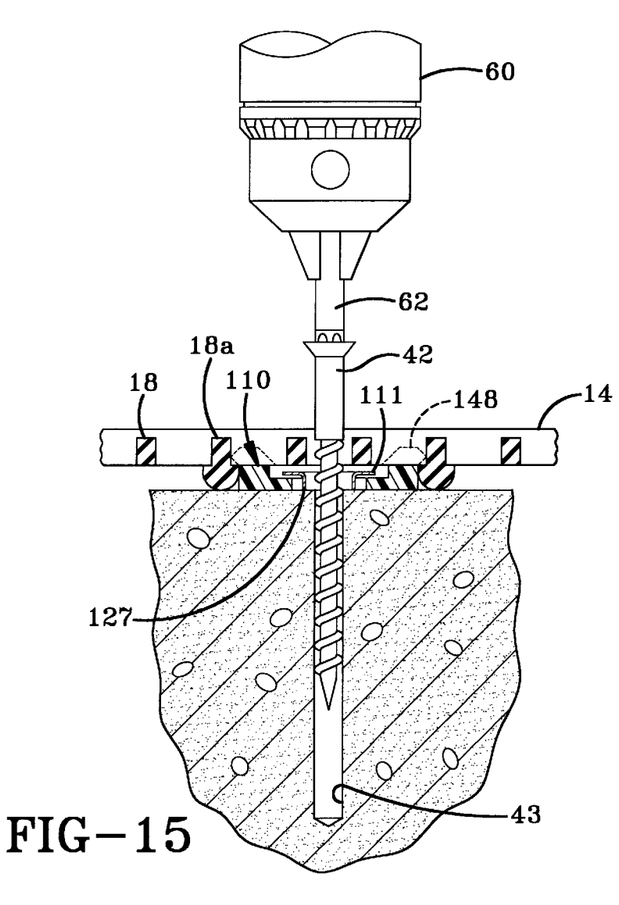
FIG. 15 is a fragmentary sectional view of the second embodiment showing the clip being secured to the floor.
Figure 16:
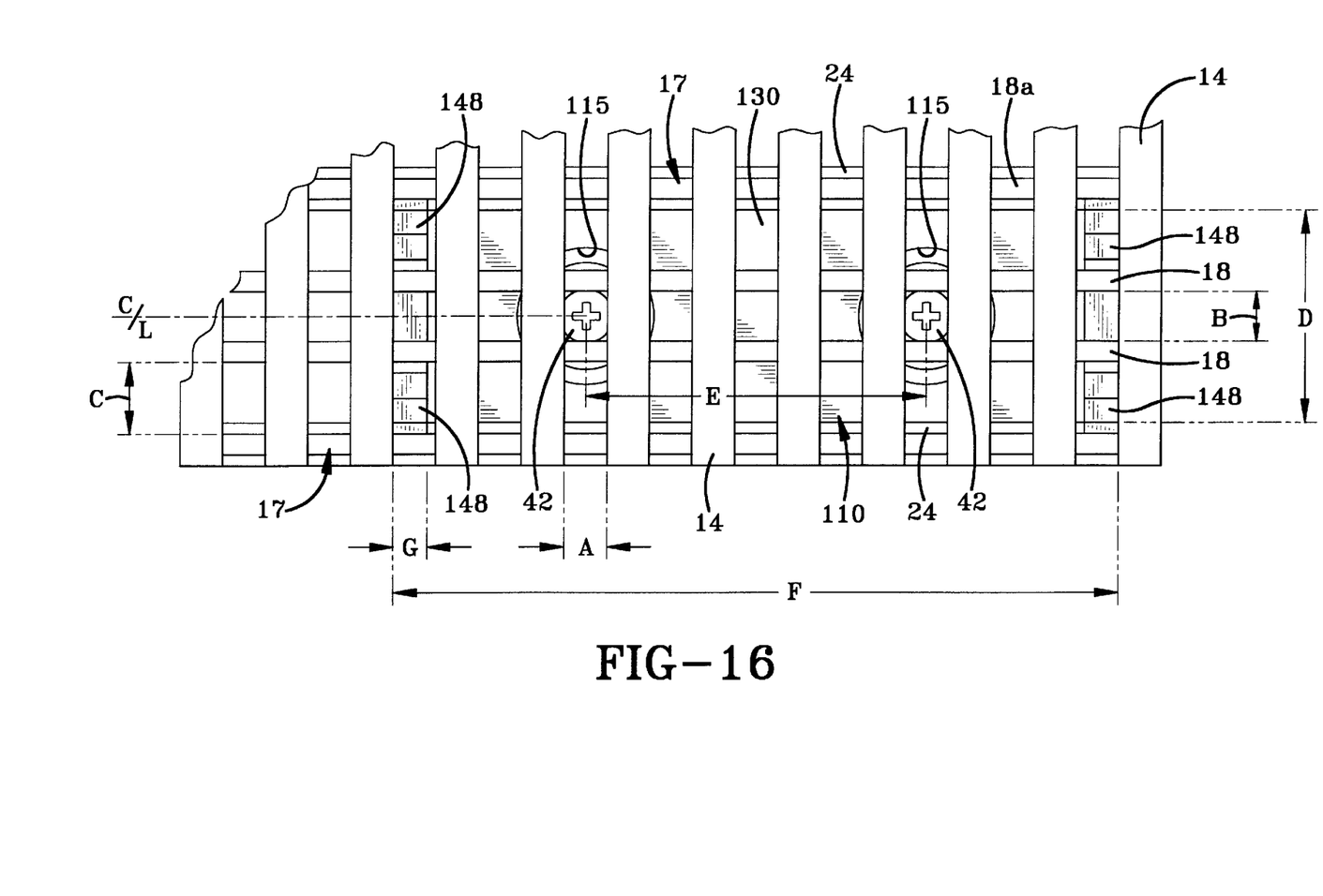
FIG. 16 is a fragmentary top plan view of the second embodiment showing alignment of the screws with certain of the openings of the floor mat when the floor mat system is initially installed onto the floor.

After mat 8 has been removed from clip 110, thermal expansion and contraction of floor mat 8 and floor 4 as well as other factors can result in misalignment between latching shoulders 24 and projections 148 (FIGS. 10 and 11.) The adjustability of clip 110 with respect to grommets 111 permits clip 110 to be repositioned such that projections 148 align with latching shoulders 24 to permit reattachment of floor mat 8 onto clip 110 after removal therefrom and any associated cleaning thereunder (FIGS. 12 and 13.) The adjustability of clip 110 facilitates the reattachment of floor mat 8 onto clip 110. Clip 110 of floor mat system 101 thus provides substantial benefits in utility and functionality beyond that previously known in the relevant art.

While grommet 111 is depicted as being a member that is separate from screw 42 and is attached to floor 4 with screw 42, it is understood that grommet 111 functions as a fastener that need not necessarily be separate from screw 42. It is understood, therefore, that screw 42 may be configured with an enlarged or flared head protruding from floor 4 with such an enlarged or flared head serving as a fastener that performs the function of grommet 111. It can also be seen that grommet 111 can be formed integrally with screw 42 to form a single fastener that adjustably retains floor mat 8 against floor 4.

Accordingly, the improved floor mat system is simplified, provides an effective, safe, inexpensive, and efficient device which achieves all the enumerated objectives, provides for eliminating difficulties encountered with prior art devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved floor mat system is constructed and used, the characteristics of the construction, and the advantageous, new and useful results obtained; the new and useful structures, devices, elements, arrangements, parts and combinations, are set forth in the appended claims.

What is claimed is:

1. A floor mat system adapted to retain a floor mat against a floor, the floor mat system comprising:
    a floor mat;
    a clip extending along a longitudinal plane;
    a fastener adapted to be attached to the floor for adjustably restraining movement of the clip in a first plane; the connection between the fastener and the clip allowing the clip to be translated with respect to the floor;
    the fastener including a fastener abutment surface;
    the clip being formed with a clip abutment surface;
    the fastener abutment surface being engageable with the clip abutment surface to restrain movement of the clip in the first plane;
    the fastener being a grommet, and further comprising a screw, the screw attaching the grommet to the floor.

2. The floor mat system as set forth in claim 1, in which the clip is formed with an attachment hole, the clip abutment surface being disposed adjacent the attachment hole.

3. The floor mat system as set forth in claim 2, in which the attachment hole has a substantially circular cross section of a first diameter, and in which the fastener abutment surface has a substantially circular cross section of a second diameter, the first diameter being larger than the second diameter.

4. The floor mat system as set forth in claim 2, in which the fastener abutment surface is circumscribed by the clip abutment surface.

5. The floor mat system as set forth in claim 1, in which the fastener further includes a locking ledge, and in which the clip is formed with a retention surface, the locking ledge being engageable with the retention surface to restrain movement of the clip in a first direction.

6. The floor mat system as set forth in claim 5, in which the first direction is substantially perpendicular to the first plane.

7. The floor mat system as set forth in claim 5, in which the retention surface is disposed adjacent to and above the clip abutment surface.

8. The floor mat system as set forth in claim 5, in which the locking ledge is disposed adjacent the fastener abutment surface.

9. A floor mat system adapted to retain a floor mat against a floor, the floor mat system comprising:
- a floor mat;
- a clip extending along a longitudinal plane;
- a fastener adapted to be attached to the floor for adjustably restraining movement of the clip in a first plane;
- the fastener including a fastener abutment surface;
- the clip being formed with a clip abutment surface:
- the fastener abutment surface being enqaqeable with the clip abutment surface to restrain movement of the clip in the first plane;
- the fastener further including a locking ledge;
- the clip being formed with a retention surface;
- the locking ledge being engageable with the retention surface to restrain movement of the clip in a first direction;
- the clip being formed with an attachment hole and a depression, the clip abutment surface being disposed adjacent the attachment hole, the retention surface being disposed adjacent the depression.

10. The floor mat system as set forth in claim 9, in which the attachment hole is disposed adjacent the depression.

11. The floor mat system as set forth in claim 9, in which the attachment hole and the depression are axially aligned.

12. The floor mat system as set forth in claim 9, in which the clip includes a top surface, the depression extending at least partially below the top surface.

* * * * *

UNITED STATES PATENT AND TRADEMARK OFFICE
CERTIFICATE OF CORRECTION

PATENT NO. : 6,319,584 B1
DATED : November 20, 2001
INVENTOR(S) : Ronald N. Kessler and Myron E. Ullman It is certified that error appears in the above-identified patent and that said Letters Patent is hereby corrected as shown below:

<u>Column 9,</u>
Line 16, change the word "enqaqeable" to read -- engageable --.

Signed and Sealed this

Seventh Day of May, 2002

*Attest:*

JAMES E. ROGAN
*Attesting Officer*  *Director of the United States Patent and Trademark Office*